United States Patent Office 3,361,619
Patented Jan. 2, 1968

3,361,619
PROCESS OF SIZING PAPER WITH A REACTION PRODUCT OF ROSIN, FORMALDEHYDE AND MONOCARBOXYLIC ACID AND SIZED PAPER THEREOF
Paul H. Aldrich, Wilmington, Del., assignor to Hercules Incorporated, a corporation of Delaware
No Drawing. Original application May 16, 1962, Ser. No. 195,319. Divided and this application June 28, 1966, Ser. No. 576,163
2 Claims. (Cl. 162—180)

ABSTRACT OF THE DISCLOSURE

Sized paper is prepared using as a size a sizing composition derived by reacting rosin with a material such as formaldehyde and a specified amount of a higher fatty monocarboxylic acid, and then neutralizing, at least partially, the product thereof with aqueous alkali.

---

This application is a division of U.S. application Ser. No. 195,319, filed May 16, 1962, now abandoned.

This invention relates to novel rosin size compositions and to the preparation and use of same for sizing paper, paperboard and the like.

It has been found that small amounts of higher fatty acids in rosin size do not materially detract from sizing. However, as the fatty acid content increases to about 3% and above, sizing is adversely affected and efficiency begins to fall off.

A principal object of the invention is the provision of novel sizing compositions in paste or dry form containing at least partially neutralized rosin and from about 3% to about 13% by weight, based on the weight of rosin, of higher fatty acids in free and combined form, said sizing compositions being equivalent in sizing efficiency to ordinary paste and/or dry rosin sizes.

A further object of the invention is the provision of paste rosin sizes which have lower than normal viscosities and which, therefore, can be made at lower acid number to improve emulsifiability.

A still further object of the invention is the provision of a paste rosin size of the indicated type having improved resistance to crystallization and sizing efficiency comparable to ordinary paste rosin size.

Another object of the invention is the incorporation of fatty acids with rosin used in the preparation of rosin size in amounts greater than hitherto thought possible without substantial decrease in sizing efficiency of the reuslting sizes.

Still another object of the invention is the provision of a method of converting mixtures of rosin and fatty acids to paste and/or dry rosin sizes having at least as good sizing efficiencies as ordinary rosin size.

A still further object of the invention is the provision of novel paper products and a method of making same.

It has now been found that the above and other objects of the invention can be attained by the provision of a rosin size composition obtained by (1) reacting rosin with formaldehyde or a formaldehyde-yielding material under relatively mild conditions, (2) reacting this product with a higher fatty acid or mixture of higher fatty acids under more drastic conditions, and (3) partially or substantially completely neutralizing the resulting product depending upon whether or not the final product is to be a paste size or a dry size. These sizes are characterized by a fatty acid content of from about 3% to about 13% by weight, based on the weight of rosin, with a portion of this fatty acid content being in combined form. These sizes are further characterized by lower viscosities than the usual paste rosin sizes and by improved emulsifiability.

The rosin sizes of the invention can be prepared from various types of rosin including gum rosin, wood rosin and tall oil rosin, in crude or refined state and/or after treatments of various kinds to increase their effectiveness for the intended purposes, as well as modified rosins such as partially hydrogenated rosins, partially disproportionated rosins and polymerized rosins.

The fatty acids contemplated for use herein are the aliphatic monocarboxylic acids having from about 14 to about 26 carbon atoms and mixtures of same. Fatty acid mixtures of this type which are quite satisfactory for use herein are various mixtures of fatty acids and fatty acid fractions derived from tall oil. A typical analysis of a fatty acid fraction obtained by the fractional distillation of tall oil is as follows:

| | Percent |
|---|---|
| Palmitic acid | 5.7 |
| Palmitoleic acid | 1.5 |
| Stearic acid | 1.4 |
| Oleic acid | 30.7 |
| Linoleic acid | 42.4 |
| Eicosanoic acid | 7.0 |
| Doersanoic acid | 2.5 |
| Linolenic acid | 1.5 |

Depending upon the tall oil source, the method of fractional distillation and the fraction taken, there will also be greater or lesser amounts of $C_{14}$ and $C_{15}$ and $C_{19}$ to $C_{26}$ acids. These acids can be unsaturated or saturated, straight or branched chained. Furthermore, the amounts of linoleic and oleic acids can each vary from about 5% to about 50%, and the amounts of other acids mentioned above can also vary from almost none to 2 to 4 times the amounts mentioned.

Other fatty acids and fatty acid mixtures which can be used herein are those resulting from the hydrolysis of various naturally occurring fats and oils such as linseed oil, lard, cotton seed oil, safflower seed oil, tallow, or from the fractional distillation or fractional crystallization of such acids.

The fatty acids may be used as such or they may be used in admixture with each other and with the rosin. For exampe, tall oil and various fractions thereof containing mixtures of resin acids and fatty acids can be used as the source of the rosin and fatty acids used in the compositions of the invention. Various blends or mixtures of rosin and fatty acids can also be made by combining rosin and fatty acids in various proportions within the range disclosed.

In preparing the sizes of the invention from rosin, for example, the rosin can first be reacted with formaldehyde or a formaldehyde-yielding material such as paraformaldehyde, aqueous formaldehyde, alcoholic formaldehyde, and so on, with or without a catalyst, at temperatures above about 100° C., e.g., from about 100° C. to about 200° C. or even higher if desired. It is preferred to carry out the reaction in the presence of an acid catalyst at temperatures from about 110° C. to about 160° C. for a period of time from about ⅛ hour to about 4 hours or longer at atmospheric pressure or under the autogenous pressure of the reactants. This reaction can be run batchwise or continuously. Any suitable acid catalyst including inorganic acids such as sulfuric, hydrochloric, phosphoric or the like, organic acids such as p-toluene sulfonic acid and acetic acid, acid clays, and so on can be used. In general, the amount of acid catalyst employed can vary from about 0.05% to about 1.0% by weight, based on the weight of rosin. It is preferred to utilize from about 0.05% to about 0.5% by weight, based on the weight of rosin.

To the formaldehyde-treated rosin is then added from about 3% to about 13% by weight, based on the weight of rosin, of a higher fatty acid or mixture of higher fatty acids and the resulting mixture heated at temperatures from about 150° C. to about 240° C. for a period of time from about ½ hour to about 24 hours. The resulting product is then at least partially neutralized with aqueous alkali such as sodium hydroxide, sodium carbonate, and potassium hydroxide or other alkali metal hydroxide or carbonate. Generally, a partial neutralization to the extent of from about 70% to about 95% is desirable for paste sizes. However, if the paste is to be converted to a dry size, substantially complete neutralization is preferred.

In an alternative and preferred procedure, the sizes of the invention can be prepared by reacting a mixture of rosin and fatty acid with formaldehyde or a formaldehyde-yielding material, with or without an acid catalyst, first under relatively mild conditions, e.g., preferably at temperatures from about 110° C. to about 160° C., for a period of time from about ⅛ hour to about 4 hours or longer at atmospheric pressure or under the autogenous pressure of the reactants and then at temperatures from about 150° C. to about 240° C. for a period of time from about ½ hour to about 24 hours. Where the desired amount of fatty acid is present, it is unnecessary to add or remove any fatty acid. Of course, if the starting mixture contains less than about 3% fatty acids, sufficient fatty acids can be added either before or after the formaldehyde treatment to bring the fatty acid content within the desired range. Following the formaldehyde treatment, the product is then neutralized as described above.

The amount of formaldehyde or formaldehyde-yielding material utilized in preparing the compositions of the invention can vary from about 1% to about 12% by weight, based on the combined weight of the rosin and fatty acids utilized, depending upon the results desired and so on. In general, amounts below 1% do not give the desired effect, while amounts above 12% sometimes give certain undesirable effects. For best results, it is preferred to utilize from about 2% to about 10% by weight, based on the combined weight of the rosin and fatty acids, of formaldehyde or an amount of a formaldehyde-yielding material which will yield a like amount of formaldehyde.

The present invention is applicable to the preparation of fortified rosin sizes as well as unfortified sizes. In the preparation of fortified sizes in accordance with the invention, several procedures are possible. In accordance with one procedure, the fortifying agent can be reacted with the formaldehyde-treated product prepared by either of the procedures described above, prior to neutralization with alkali. In accordance with another procedure, the fortifying agent can be reacted with ordinary rosin or a rosin-fatty acid mixture and the resulting product blended with the formaldehyde-treated mixture of rosin and fatty acids in an amount such as to provide up to about 50%, and preferably from about 20% to about 50% by weight, based on the weight of rosin, of the product.

The reaction of the fortifying agent with the rosin can be carried out in known manner utilizing from about one-twentieth mole to about one mole, per mole of rosin, of the fortifying agent, e.g., an acidic compound containing the

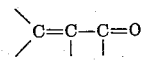

group including α,β-unsaturated monobasic and polybasic organic acids and acid anhydrides such as acrylic, maleic, fumaric, itaconic and citraconic acids and their anhydrides. Products of this type and methods of preparing same as well known as shown, for example, in U.S. 2,628,918 and U.S. 2,684,300.

The paste rosin sizes of the invention can be prepared at any desired solids content, i.e., from about 50% to about 80% total solids, but will usually be prepared with total solids of from about 70% to about 80%. These paste rosin sizes are readily converted to primary emulsions containing from about 6% to about 20% solids by adding water at 25–100° C. These can be mixed with cold water to form stable, dilute, secondary emulsions containing from about 1% to about 5% solids.

In the manufacture of dry sizes in accordance with the invention, essentially the same procedure can be followed as used in the preparation of the paste size except that the product is preferably substantially completely neutralized rather than only partially neutralized. The resulting pastes can then be dehydrated as by spray drying to form the dry sizes.

In the sizing of paper in accordance with the invention, the novel sizes herein described are added to an aqueous pulp suspension, as in the beater of a papermaking system or at any other point prior to web formation, the dry size being added as such or in an aqueous dispersion, and the paste size being added in the form of a dilute, aqueous emulsion. The size is added in an amount sufficient to supply from about 0.25% to about 5% by weight, based on the weight of dry pulp, of solids. After thoroughly beating the mixture, aluminum sulfate or like fixing agent is added in suitable amounts, e.g., from about 1% to about 5% by weight, based on the weight of dry pulp, and the pulp then sheeted and dried in the usual manner.

The following examples will further illustrate the invention:

*Example 1*

Six hundred parts of a tall oil rosin (acid number 166.8, rosin acids 87.5%, fatty acids 2.9%, neutrals 8.3%) was warmed to 130° C., held at this temperature, and stirred. To this hot rosin were added 0.6 part concentrated sulfuric acid and 18 parts commercial (Celanese Corporation of America) paraformaldehyde flake (91% formaldehyde). The paraformaldehyde was added in portions of 1 part at 5-minute intervals to avoid excessive foaming caused by the release of the water of reaction together with a small fraction of formaldehyde which does not react. Five minutes after the last portion of paraformaldehyde was added, the temperature of the reaction was raised rapidly (30 minutes) to 220° C. This temperature was held for 60 minutes after which the mixture was cooled to room temperature. The product analyzed as follows:

Acid number _____ 156.1
Rosin acids _____percent__ 83.3
Fatty acids _____do____ 1.0
Neutrals _____do____ 8.5

*Example 2*

Using the method of Example 1, 600 parts of a tall oil rosin (acid number 171.5; rosin acid 85.5%, fatty acids 6.5%, neutrals 7.8%) were reacted with 18 parts paraformaldehyde with 0.6 part concentrated sulfuric acid as catalyst. The product analyzed as follows:

Acid number _____ 154.6
Rosin acids _____percent__ 80.5
Fatty acids _____do____ 2.8
Neutrals _____do____ 7.6

*Example 3*

Using the method of Example 1, 570 parts of a tall oil rosin (same as Example 2) and 30 parts of commercial (Drew 400, E. F. Dew Company) stearic acid (acid number 198.8, 0.35% neutrals) were reacted with 18 parts paraformaldehyde with 0.6 part concentrated sulfuric acid as catalyst. The commercial stearic acid contained about 87% stearic acid with minor amounts of oleic, palmitic, myristic acids. The product analyzed as follows:

Acid number _____ 154.8
Rosin acids _____percent__ 76.5
Fatty acids _____do____ 6.2
Neutrals _____do____ 7.8

Example 4

Using the method of Example 1, 570 parts of a tall oil rosin (same as in Example 2) and 30 parts tall oil fatty acids (acid number 191.3, rosin acids 3.5%, fatty acids 92.9%, neutrals 3.5%) were reacted with 18 parts paraformaldehyde with 0.6 part concentrated sulfuric acid as catalyst. The particular sample of tall oil fatty acids used was prepared by distillation. The product from this reaction analyzed as follows:

Acid number _____ 154.3
Rosin acids _____percent__ 76.2
Fatty acids _____do____ 6.3
Neutrals _____do____ 7.8

Examples 5–12

Sizes were made from the rosins of Examples 1–4 by melting the rosin and adding aqueous caustic to give about 80% total solids and 24–25 acid number. Stormer viscosity and sizing efficiency were determined for each of these sizes. In addition, for use as controls, sizes were similarly made using the rosin raw materials for Examples 1 and 2 and rosin-fatty acid blends corresponding to the raw materials for Examples 3 and 4. In order to prevent crystallization of these latter sizes, which were prepared from the non-formaldehyde-treated rosins, it was necessary to make them with 70% total solids and 10 acid number. Sizing efficiencies were determined for these latter four sizes in comparison with the above four sizes.

For the sizing comparison, the 3% emulsions were prepared in a conventional manner and used according to the following procedure:

Bleached kraft pulp was beaten to a Schopper-Reigler freeness of 750±10 cc. at 4.5% pulp consistency. This pulp was diluted to 2.5% consistency and the pH adjusted to pH 7. The proper amount of size was added as a 3% aqueous emulsion. Sufficient papermakers' alum was added to lower the pH of the slurry to about 4.3. The stock was then diluted to 0.25% consistency with pH 4.5 water containing 5 p.p.m. aluminum ion as alum. Sheets of paper were made in a Noble and Wood handsheet machine at 0.025% consistency using pH 4.5 water containing 5 p.p.m. aluminum ion as alum for diluting the pulp for the first sheet and recycle water for the remaining sheets. The sheets were pressed and dried and conditioned at 70° C., 50% relative humidity, and (beginning with the fourth sheet in each run) tested for sizing using the Hercules photometer. Results are shown in Table 1.

paraformaldehyde flake (91% formaldehyde) were added in portions of 5 parts at 5-minute intervals. The amount of paraformaldehyde added represents 5% $CH_2O$ based on the weight of tall oil rosin. One-half hour after the last paraformaldehyde portion had been added, the reaction temperature was raised in a period of 35 minutes to 220° C. The reaction mixture was held at this temperature with relatively mild stirring for two hours, after which the product was cooled. The reaction product had the following analyses:

Acid number _____ 141.4
Resin acids _____percent__ 68.6
Free fatty acids _____do____ 6.3

A size was made from this resin by adding aqueous caustic to the melted resin to give a product with acid number 22 and total solids 70%.

Example 13

Using the method described in Example 13, a mixture of 1000 parts of the same tall oil rosin and 147 parts of the same tall oil fatty acid were reacted with 110 parts of commercial (Celanese Corporation of America) paraformaldehyde flake (91% mormaldehyde) using 1.0 part of sulfuric acid catalyst. The amount of paraformaldehyde added represents 10% $CH_2O$ based on the weight of rosin. The product had the following analyses:

Acid number _____ 127.0
Resin acids _____percent__ 64.0
Free fatty acids _____do____ 4.2

A size was made from this resin by adding aqueous caustic to the melted resin to give a product with acid number 22 and total solids 70%.

Example 15

704.6 parts of a Diels Alder adduct of tall oil rosin, prepared by heating to 200° C. for 3 hours a mixture of 3520 parts by weight of tall oil rosin C (acid number 166.7, resin acids 87.0%, fatty acids 2.7%) and 480 parts by weight of fumaric acid, were dissolved in 2000 parts by volume of methanol. To this solution was added 2200 parts by volume of heptane which had been equilibrated with a 61% aqueous methanol solution. One thousand parts of distilled water was then added. After the mixture had been shaken, the aqueous layer was separated and washed with three portions (1000 parts by volume) of heptane, equilibrated previously with 61% aqueous methanol. The first heptane layer separated was

TABLE 1

| Example No. | Product or Rosin Source From Which Size Prepared | Percent Rosin Acids in Rosin Source | Percent Fatty Acids, Total in Rosin Source plus Added | Percent Formaldehyde Based on Rosin | Stormer Viscosity Poises, 60° C. | Photometer Sizing Seconds Standard Feather Ink | |
|---|---|---|---|---|---|---|---|
| | | | | | | 0.75% Size | 2.25% Size |
| 5 | Ex. 1 product | 83.3 | 2.9 | 2.7 | 45 | 129 | 460 |
| 6 | Rosin used in Ex. 1 | 83.3 | 2.9 | 0 | | 128 | 440 |
| 7 | Ex. 2 product | 85.5 | 6.5 | 2.7 | 43 | 130 | 455 |
| 8 | Rosin used in Ex. 2 | 85.5 | 6.5 | 0 | | 103 | 418 |
| 9 | Ex. 3 product | ¹81.2 | 10.53 | 2.9 | 27 | 122 | 447 |
| 10 | Rosin, fatty acid blend used in Ex. 3 | ¹81.2 | 10.53 | 0 | | 65 | 372 |
| 11 | Ex. 4 product | ¹81.4 | 10.83 | 2.9 | 29 | 122 | 444 |
| 12 | Rosin, fatty acid blend used in Ex. 4 | ¹81.4 | 10.83 | 0 | | 50 | 384 |

¹ This percentage figure based on composition of rosin source as modified by added fatty acids.

Example 13

A mixture of 1200 parts of a tall oil rosin A (acid number 164.0, resin acids 84.5%, fatty acids 3.4%) and 176.4 parts of tall oil fatty acids B (acid number 191.3, resin acids 3.5%, fatty acids 92.9%) were warmed together to 130° C. 1.2 parts of concentrated sulfuric acid catalyst were added with stirring. Then, at a constant temperature of 130° C. and with vigorous stirring, 66 parts of commercial (Celanese Corporation of America)

then extracted with about 500 parts by volume of fresh 61% aqueous methanol. The two aqueous methanol solutions were combined, concentrated, and added slowly to ice water with mild stirring. The precipitate was allowed to settle overnight, after which it was separated by filtration and dried to yield 340 parts of purified adduct which had the following analyses:

Acid number _____ 351
Aqueous saponification number _____ 383

A portion of the purified adduct was added with vigorous stirring to a hot caustic solution. The paste size prepared in this manner had an acid number of 8 and total solids of 53.5%.

*Example 16*

A size was made by adding aqueous caustic to a molten sample of tall oil rosin A (used in Example 13). This size had acid number 22 and total solids 70%.

*Example 17*

A size was made by adding aqueous caustic to a molten sample of tall oil rosin C (used in Example 15). This size had acid number 22 and total solids 70%.

*Example 18*

A blend was made of some of the above sizes as follows:

| | G. |
|---|---|
| Example 15 | 13.5 |
| Example 16 | 37.1 |
| Example 17 | 11.7 |

To this was added 4.2 grams fatty acid B used in the preparation of the resin of Example 13. This size contained 12.3% free fatty acid, based on rosin, including that combined with fumaric acid (but not the fumaric acid) and 14.4% purified fumaric acid adduct of Example 15, based on the total solids in the size.

*Example 19*

A blend was made of some of the above sizes as follows:

| | G. |
|---|---|
| Example 13 | 40.8 |
| Example 15 | 13.5 |
| Example 17 | 12.7 |

This size contained 12.3% fatty acid (free and combined), based on weight of rosin, including that combined with fumaric acid (but not the fumaric acid) and 14.4% purified fumaric acid adduct of Example 15, based on the total solids of the size. Based upon the total solids of the size, 2.9% formaldehyde was used to treat the resin. Based on the rosin, including that combined with fumaric acid (but not the fumaric acid), 3.5% formaldehyde was used.

*Example 20*

A blend was made of some of the above sizes as follows:

| | G. |
|---|---|
| Example 14 | 21.2 |
| Example 15 | 6.8 |
| Example 17 | 5.8 |

This size contained 12.3% fatty acid (free and combined), based on weight of rosin, including that combined with fumaric acid (but not the fumaric acid) and 14.4% purified fumaric acid adduct of Example 15, based on the total solids of the size. Based upon the total solids of the size, 5.8% formaldehyde was used to treat the resin. Based on the rosin, including that combined with fumaric acid (but not the fumaric acid), 7.4% formaldehyde was used.

*Example 21*

A blend was made of some of the above sizes as follows:

| | G. |
|---|---|
| Example 15 | 13.5 |
| Example 17 | 55.4 |

This size contained 2.9% fatty acid, based on rosin, including that combined with fumaric acid (but not the fumaric acid) and 14.4% purified fumaric acid adduct of Example 15, based on the total solids of the size.

*Examples 22–25*

Using the handsheet and testing methods of Examples 5–12 but substituting a bleached sulfite pulp for the bleached kraft pulp, the sizes of Examples 18, 19, 20 and 21 were compared for sizing efficiency. The clearing temperature for 16% primary emulsions was also measured. The results are summarized in Table 2.

TABLE 2

| Example No. | Size Used | Percent Fumaric Adduct Based on Total Solids in Size | Percent Free and Combined Fatty Acids Based on Rosin | Percent Formaldehyde | | Photometer Sizing Seconds Standard Feather Ink 2.25% Size Added | Primary Emulsion Clearing Temperature, °C. |
| | | | | Based on Total Solids in Size | Based on Rosin | | |
|---|---|---|---|---|---|---|---|
| 22 | From Ex. 18 | 14.4 | 12.3 | 0 | 0 | 77 | 93 |
| 23 | From Ex. 19 | 14.4 | 12.3 | 2.9 | 3.5 | 326 | 69 |
| 24 | From Ex. 20 | 14.4 | 12.3 | 5.8 | 7.4 | 358 | 52 |
| 25 | From Ex. 21 | 14.4 | 2.9 | 0 | 0 | 331 | 73 |

It will thus be seen that the present invention provides paste and dry rosin sizes from rosin and fatty acids, such sizes having lower than normal viscosities for sizes of this type, improved emulsifiability, and substantially equivalent sizing efficiency.

What I claim and desire to protect by Letters Patent is:

1. The method of sizing paper which comprises forming an aqueous suspension of paper pulp, adding to the pulp from about 0.25% to about 5% by weight (solids basis), based on the weight of dry pulp, of a partially neutralized reaction product of rosin, consisting essentially of rosin, from about 1% to about 12% by weight, based on the weight of rosin, of a material selected from the group consisting of formaldehyde and paraformaldehyde and from about 6.5% to about 13% by weight, based on the weight of rosin, of higher fatty acid, said higher fatty acid being selected from the group consisting of aliphatic monocarboxylic acids having from about 14 to about 26 carbon atoms and mixtures thereof admixing with the pulp from about 1% to about 5% by weight, based on the weight of pulp, of aluminum sulfate, forming the pulp into sheets, and drying the sheets.

2. Paper sized with from about 0.25% to about 5% by weight, based on the weight of dry pulp in the paper, of the partially neutralized reaction product of rosin, consisting essentially of rosin, from about 1% to about 12% by weight, based on the weight of rosin, of a material selected from the group consisting of formaldehyde and paraformaldehyde, and from about 6.5% to about 13% by weight, based on the weight of rosin, of higher fatty acid, said higher fatty acid being selected from the group consisting of aliphatic monocarboxylic acids having from about 14 to about 26 carbon atoms and mixtures thereof.

References Cited

UNITED STATES PATENTS

| 2,744,889 | 5/1956 | Gayer | 106—219 X |
| 2,985,537 | 5/1961 | Watkins | 106—238 |
| 2,994,635 | 8/1961 | Reaville et al. | 162—179 |
| 3,194,728 | 7/1965 | Stump | 162—179 |
| 3,253,937 | 5/1966 | Stump | 162—180 X |

S. LEON BASHORE, *Primary Examiner.*